Patented July 12, 1932

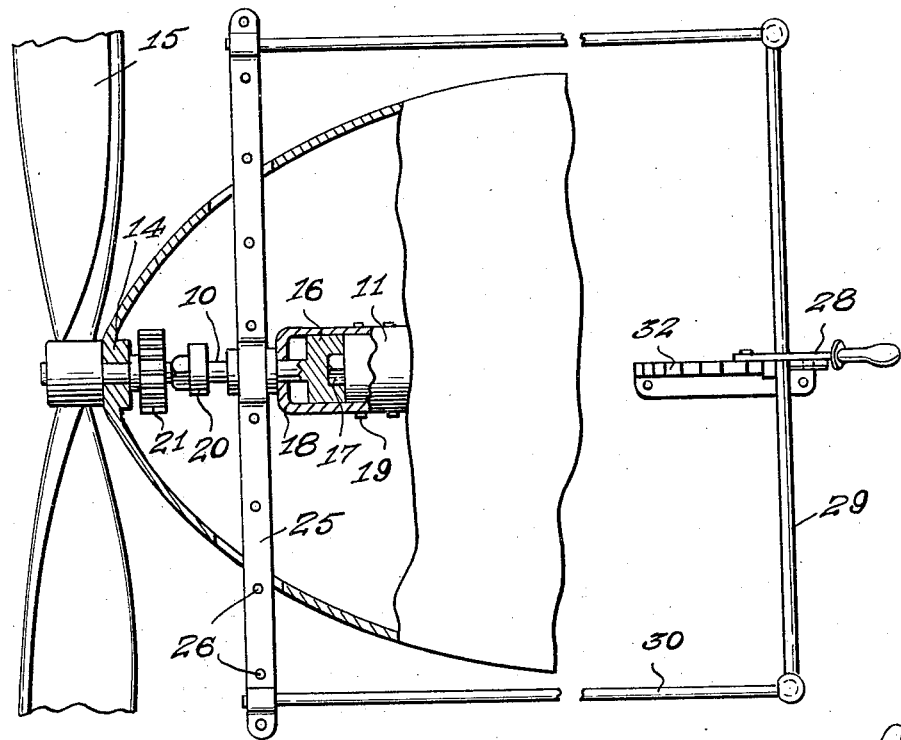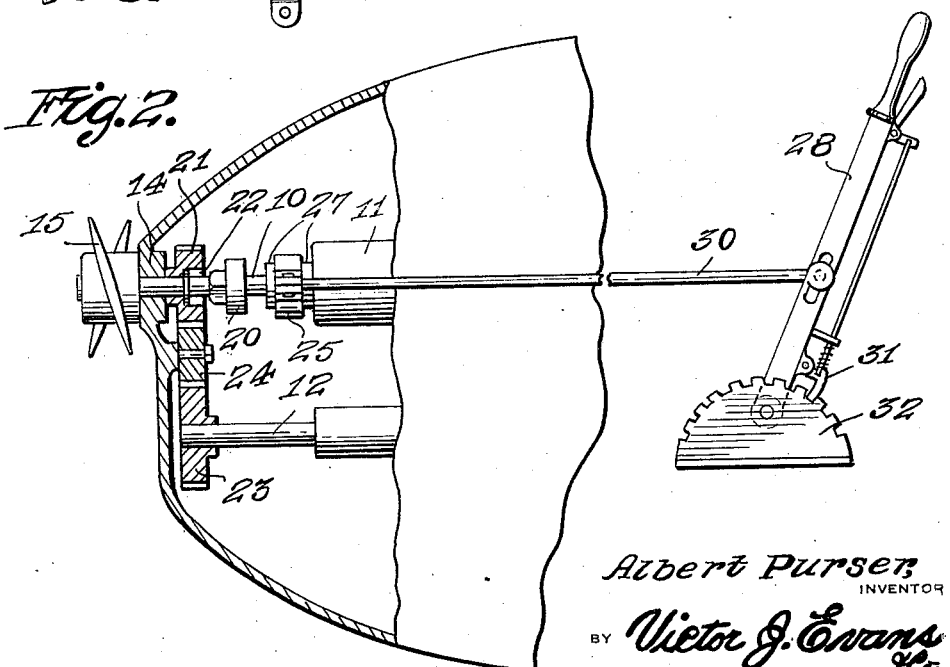

1,867,473

UNITED STATES PATENT OFFICE

ALBERT PURSER, OF BROOKLYN, NEW YORK

AUXILIARY AIRPLANE ENGINE MECHANISM

Application filed August 3, 1931. Serial No. 554,917.

The object of the invention is to provide a mechanism for application to airplanes and other aircrafts; to provide for keeping the propeller in motion in the event of failure of the main propulsion mechanism, so that the ship may be kept aloft until a suitable landing place is found; to provide a mechanism of this nature which includes means for effecting connection of the propeller with an auxiliary engine to be set in motion in the event of failure of the main engine; to provide mechanism of this character which is of simple form and susceptible of cheap manufacture.

With this object in view, the invention consists in a construction and combination of parts of which a preferred embodiment is illustrated in the accompanying drawing, wherein:

Fig. 1 is a plan view, partly in section, showing the nose or forward end of an airplane with the invention incorporated in the driving mechanism.

Fig. 2 is an elevational view, partly in section, of the structure shown in Fig. 1.

In carrying out the invention, the propeller shaft 10 is made independent of the main drive engine shaft 11, so that it may be selectively coupled to this shaft to be driven thereby, or to the shaft 12 of an auxiliary engine which, in the event of failure of the main engine, is set in motion, to keep the propeller moving, so that the ship may be kept under control and thereby be brought to ground without the danger attending handling when the propeller is inoperative, as it would be in the event of failure of the engine.

The propeller shaft 10, in the illustrated embodiment, has a bearing 14 in the nose of the ship and exteriorly thereof carries a propeller 15. The rear end of the propeller shaft is formed with a clutch member 16 engageable with or disengageable from a clutch member 17 formed on the end of the main engine shaft. The clutch member 16 is slidably mounted in a sleeve 18 secured, as at 19 to the main engine shaft 11. The sleeve serves as a rear bearing for the propeller shaft 10 by reason of the clutch element 16 being formed as an integral part of the shaft. The propeller shaft, by reason of this construction, is axially movable, so that the clutch elements 16 and 17 may be engaged or disengaged, and in the latter relation of the parts, the clutch member 20, which is also mounted on and secured to the propeller shaft, is engaged with a gear 21 in the socket 22 of the latter. The gear 21 is floatably mounted on the propeller shaft and is driven by the auxiliary engine when the latter is in motion, by reason of the gear 23 which is mounted on the shaft 12 of the latter and operatively connected with the gear 21 through the idle gear 24.

The means for effecting connection of the propeller shaft with either the main engine shaft or the auxiliary engine shaft consists of a yoke 25 composed of complemental elements secured together by fasteners 26, the elements of the yoke being disposed between flanges 27 on the propeller shaft, so that if the yoke is moved, axial movement may be imparted to the shaft. The means for effecting yoke movement consists of a hand lever 28, to which a cross bar 29 is connected, the extremities of the cross bar being operatively connected to the yoke with the pull rods 30. The selected position of the hand lever is maintained through the instrumentality of a latch 31 carried by the latter and engageable with the teeth of a sector 32.

In the rearward or retracted position of the hand lever, the propeller shaft is drawn rearwardly to engage the clutch elements 16 and 17 when the propeller is in position to be driven by the main engine and this generally will be the position of the parts except in the event of failure of the main engine, when the operator will immediately place the auxiliary engine in operation, thereafter moving the hand lever 28 forwardly, when the clutch element 20 will be engaged with the gear 21. The propeller will thereafter be kept in motion by the auxiliary engine until a safe landing can be effected.

The invention having been described, what is claimed as new is:

Mechanism for the purpose indicated comprising a propeller and an axially movable shaft therefor, a pair of drive shafts constituting elements of separate driving members, clutch elements carried by the propeller shaft, complemental clutch elements carried one by one of the drive shafts and the other by the propeller shaft but floatingly mounted thereon, operative connections between the other drive shaft and said floatingly mounted clutch element, and means for imparting axial movement to the propeller shaft to selectively connect either pair of clutch elements.

In testimony whereof I hereby affix my signature.

ALBERT PURSER.